United States Patent Office 2,750,407
Patented June 12, 1956

2,750,407

SUBSTITUTED PHENANTHRENECARBOXYLIC ACID AND ESTERS THEREOF

Paul F. Ritchie, Wilmington, Del., assignor to Hercules Powder Company, Wilmington, Del., a corporation of Delaware No Drawing. Application July 31, 1953, Serial No. 371,719

9 Claims. (Cl. 260—473)

This invention relates to new oxygenated derivatives of dehydroabietic acid and esters thereof and, more particularly, to 14-hydroxy-9-oxodehydroabietic acid and esters thereof and the preparation of these compounds.

In accordance with this invention, valuable new derivatives of dehydroabietic acid have been prepared, which compounds contain both a keto and hydroxy or acyloxy group in addition to the carboxyl radical. These new products may be prepared by oxidizing an ester of dehydroabietic acid to the corresponding ester of 9-oxodehydroabietic acid and then subjecting the latter compound to further oxidation whereby a hydroxyl radical is introduced at the 14-position. The free acid, 14-hydroxy-9-oxodehydroabietic acid, may then be obtained by saponification of this ester. The hydroxyl radical in the 14-position of the ester or the free acid may be acylated if desired to produce a mono- or di-ester, respectively.

The new compounds of this invention are believed to have the following structural formula:

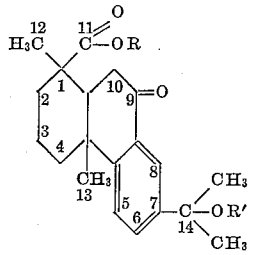

where R may be hydrogen, alkyl, hydroxyalkyl, cycloalkyl, aryl, or aralkyl and R' may be hydrogen or acyl.

In accordance with this invention, esters of 14-hydroxy-9-oxodehydroabietic acid may be prepared by oxidizing an ester of 9-oxodehydroabietic acid with a gas containing free oxygen in the presence of a free radical oxidation initiator, whereby the corresponding ester of 14-hydroperoxy-9-oxodehydroabietic acid is produced and then reducing the hydroperoxide group of the latter compound to the alcohol. Small amounts of them are also produced when an ester of dehydroabietic acid is oxidized in the molten state with a gas containing free oxygen in the presence of a metallic salt.

The following examples will illustrate the preparation of the new compounds of this invention. All parts and percentages are by weight unless otherwise indicated.

Example 1

Ten parts of methyl 9-oxodehydroabietate and 0.750 part of benzoyl peroxide were placed in a reaction vessel provided with a gas inlet tube at the bottom and a gas exit tube near the top and the system was flushed out and filled with oxygen. The reaction mixture was liquefied by heating it to 90° C., at which temperature it was held throughout the oxidation. Circulation of oxygen through the reaction mixture was then begun at the rate of 600 ml./min., the oxygen pressure being maintained constant at atmospheric pressure throughout the oxidation. After 24 hours, the oxygen absorbed amounted to 57.3 mole per cent. On analysis the reaction mixture was found to contain 41.6 mole per cent of hydroperoxide.

The oxidate was then dissolved in 300 parts of methanol and to the agitated solution was added during a period of 1 hour 10.4 parts of sodium sulfide dissolved in 100 parts of a 1:1 mixture of water and methanol. After the addition of the sodium sulfide solution was complete, the reaction mixture was heated at reflux temperature for 2 hours. The product was recovered by pouring the reaction mixture into a large excess of water, extracting the latter with ether, and after thoroughly washing and drying the ethereal solution, removing the ether. The product so obtained was an oil. This oil (7.9 parts) was then absorbed on an alumina column. Elution of the column with a 1:1 mixture of benzene and methylene chloride removed 3.46 parts of unoxidized methyl 9-oxodehydroabietate. The column was then eluted with methylene chloride whereby 0.25 part of additional material was removed. On elution of the column with a 1:1 mixture of methylene chloride and diethyl ether, 3.27 parts of methyl 14-hydroxy-9-oxodehydroabietate was obtained.

Proof that the above noncrystalline material was the 14-alcohol was shown by acetylating a portion of the product to produce the monoacetate. This was done by dissolving a portion of the above noncrystalline alcohol in a mixture of dry pyridine and acetic anhydride. After standing for several days, the reaction mixture was poured into a large excess of water and the product was extracted with ether. The ethereal solution was washed with 5% hydrochloric acid and water, dried with anhydrous sodium sulfate and evaporated to dryness. The product was then crystallized from methanol. These crystals were decolorized with activated charcoal and recrystallized to obtain crystals having a constant melting point of 130°–131° C. The carbon and hydrogen analysis made on a sample of these crystals agreed with that calculated for a monoacetate of methyl 14-hydroxy-9-oxodehydroabietate ($C_{23}H_{30}O_5$). On heating this acetate above its melting point, acetic acid was evolved. The ultraviolet absorption spectrum of the compound corresponded exactly with that of methyl 9-oxodehydroabietate.

Example 2

Ten parts of methyl 9-oxodehydroabietate was oxidized in the presence of 0.500 part of benzoyl peroxide at 90° C. as described in the foregoing example. After 25 hours, the oxygen absorbed amounted to 52.9 mole per cent and the oxidate contained 45.0 mole per cent of hydroperoxide.

This oxidate was dissolved in 100 parts of ether. The ethereal solution was then rapidly agitated and mixed with 50 parts of water. To the emulsion thus obtained was slowly added a solution of 5 parts of ferrous sulfate in 50 parts of water. The reaction mixture was agitated for 3 hours at room temperature, after which the ether phase was separated and the aqueous phase was washed with ether. The combined ether solution and washings were then thoroughly washed with water and dried with anhydrous sodium sulfate. On evaporation of the ether, 9.5 parts of an oil was obtained.

The oily product was dissolved in 50 parts of benzene and adsorbed on an alumina column. Elution of the column with benzene removed 4.0 parts of unoxidized methyl 9-oxodehydroabietate. The column was then eluted with a 1:1 mixture of benzene and methylene chloride whereby 0.50 part of material, found to be the methyl ester of 7-acetyl-octahydro-1,4a-dimethyl-9-oxo-1-phenanthrenecarboxylic acid, was removed. On elution of the column with a 4:1 mixture of methylene chloride and diethyl ether, there was obtained 2.80 parts of methyl 14-hydroxy-9-oxodehydroabietate. Proof of the latter compound was obtained by acetylating a portion of the product as described in the foregoing example whereby the acetate having a melting point of 130°–131° C. when recrystallized from methanol was obtained.

*Example 3*

Methyl dehydroabietate (31.4 parts) and 0.31 part of a hydrocarbon solution containing 6% of cobalt naphthenate were placed in a reaction vessel provided with an agitator, a gas inlet tube at the bottom and a gas exit tube near the top and the system was flushed out and filled with oxygen. The reaction mixture was liquefied by heating it to 80° C., at which temperature it was held throughout the oxidation. Circulation of oxygen through the reaction mixture was then begun, the oxygen pressure being maintained constant at atmospheric pressure throughout the oxidation. At the end of 5 hours, the absorption of oxygen amounted to 100 mole per cent. The product was dissolved in ether and the ethereal solution was washed first with 1% aqueous sodium hydroxide, then with 5% aqueous hydrochloric acid, and finally with water. The ethereal solution was dried with anhydrous sodium sulfate and the product was recovered by removal of the ether.

The oxidate so obtained was adsorbed on a column of alumina. The column was then eluted with methylene chloride whereby 24.5 parts of material was removed, which material consisted chiefly of unoxidized methyl dehydroabietate and methyl 9-oxodehydroabietate. Elution of the column with a 1:1 mixture of methylene chloride and diethyl ether then removed 6.4 parts of a material which could not be crystallized but which was shown to be methyl 14-hydroxy-9-oxodehydroabietate by acetylating a portion of the product whereby the monoacetate having a melting point of 129°–130° C. was obtained.

As shown by the foregoing examples, the new esters of this invention, the esters of 14-hydroxy-9-oxodehydroabietic acid, may be prepared by subjecting an ester of 14-hydroperoxy-9-oxodehydroabietic acid to the action of a reducing agent whereby the hydroperoxy radical is reduced to the hydroxyl radical. The 14-hydroperoxy-9-oxodehydroabietic acid esters are obtained by the liquid phase oxidation of 9-oxodehydroabietic acid esters with oxygen or an oxygen-containing gas, preferably in the presence of a free radical oxidation initiator.

The esters of 9-oxodehydroabietic acid from which the 14-hydroperoxy compound is prepared are obtained by the oxidation of the corresponding ester of dehydroabietic acid. This oxidation may be carried out in a variety of ways, as, for example, oxidizing the ester in the molten state with an oxygen-containing gas in the presence of a metallic compound or by the oxidation in liquid phase with an oxygen-containing gas in the presence of a free radical oxidation initiator with the subsequent reduction of the 9-hydroperoxydehydroabietate, so produced, to the 9-oxo compound.

The first of these methods of oxidizing esters of dehydroabietic acid, that is, the metal catalyzed oxidation process, is carried out by passing an oxygen-containing gas through the ester in the molten state in the presence of a metallic compound. The temperature at which the oxidation is carried out must be at least that of the melting point of the ester being oxidized, as, for example, a temperature above about 62° C. in the case of methyl dehydroabietate, 30° C. in the case of ethyl dehydroabietate, 104° C. in the case of the glycerol ester of dehydroabietic acid, etc. In general, a temperature at which the oxidation of the alkyl dehydroabietate is carried out is from above the melting point of the ester to about 125° C., and preferably between about 65° C. and 100° C. Any salt of a metal may be used to catalyze this oxidation reaction provided that the metallic compound is at least slightly soluble in the reaction mixture.

Of particular value are those metallic salts which are soluble in organic solvents and may then be added to or dissolved in the molten ester in the form of a solution of the metallic salt in an inert organic solvent. Exemplary of the metallic compounds which may be used are such salts as the chlorides, acetates, stearates, naphthenates, resinates, etc., of such metals as cobalt, iron nickel, palladium, copper, cadmium, mercury, aluminum, tin, chrominum, molybdenum, manganese, etc. Any amount of the metallic salt may be used but, in general, it will vary from a catalytic amount to about 5% based on the weight of the ester. The oxidation should be carried out until at least 1 mole of oxygen per mole of ester has been absorbed since at lower oxygen absorptions the oxidate is a mixture of the 9-oxo- and 9-hydroxy-dehydroabietates and unoxidized ester. At oxygen absorptions of 1 mole of oxygen per mole of ester or higher, the oxidate is chiefly the 9-oxo compound and in addition contains small amounts of 14-hydroxy-9-oxodehydroabietate, the amount of the latter product being dependent upon the total degree of oxidation. The 9-oxodehydroabietate may be separated from the reaction mixture by countercurrent extraction with two immiscible solvents or by chromatographing the reaction mixture on alumina.

As already pointed out, esters of 9-oxodehydroabietic acid may also be prepared by the oxidation of an ester of dehydroabietic acid in liquid phase with oxygen and then reducing the hydroperoxide so obtained to the ketone. This oxidation process is most readily carried out by passing an oxygen-containing gas through the ester in the liquid state, that is, either molten or dissolved in an inert solvent. Any gas containing free oxygen may be used for carrying out the oxidation, as, for example, molecular oxygen or air. The temperature at which the oxidation is carried out will depend upon the reaction conditions. For example, if it is carried out in the absence of a solvent, the temperature must be at least that of the melting point of the ester being oxidized, as, for example, above about 62° C. in the case of methyl dehydroabietate, 30° C. in the case of ethyl dehydroabietate, etc. If a solution of the ester is used, as for example, tert-butyl benzene, lower temperatures may be used for the oxidation. In general, the oxidation is carried out at a temperature between about 60° C. and 130° C., and preferably between about 65° C. and about 100° C. This oxidation is preferably carried out in the presence of a free radical oxidation initiator, i. e., a material which undergoes thermal decomposition to form free radicals under the reaction conditions. Of particular value are the peroxidic free radical oxidation initiators such as organic peroxides and organic hydroperoxides which form free radicals under the reaction conditions. Exemplary of the peroxidic compounds which may be used are acetyl peroxide, benzoyl peroxide, tert-butyl peroxide, methyl ethyl peroxide, tert-butyl hydroperoxide, $\alpha,\alpha$-dimethylbenzyl hydroperoxide, naphthene hydroperoxides, etc. The oxidate so obtained and containing the ester of 9-hydroperoxydehydroabietic acid is then subjected to reduction with a metallic reducing agent to produce the 9-oxodehydroabietate. Any metallic compound containing a metallic atom which is capable of acting as a reducing agent, i. e., which exists in more than one valence state and is in one of its lower valence states and is capable of being oxidized to one of its higher valence states, may be employed. Exemplary of such metallic reducing agents are the sulfates, nitrates, chlorides, naphthenates, acetates, etc., of iron, cobalt, nickel, manganese, chrominum, tin, lead, mercury, copper, etc., wherein the metallic ion is in one of its lower oxidation states. The metallic reducing agent is preferably one which is water-soluble. The reduction is most easily carried out by adding a solution of the metallic reducing agent to a solution of the 9-hydroperoxydehydroabietate in an inert solvent which is preferably one in which ionization is possible. Solvents which may be used for this purpose are aqueous alcohol, acetone, dioxane, etc. The esters of 9-oxodehydroabietic acid are then obtained from the reduction reaction mixture by pouring the latter into water and extracting the organic product by means of ether or some other water-immiscible solvent.

The esters of 14-hydroperoxy-9-oxodehydroabietic acid which are then reduced to produce the products of this invention may be prepared by the oxidation of the 9-oxodehydroabietate with an oxygen-containing gas in the presence of a free radical oxidation initiator in the same manner as that described above for the preparation of esters of 9-hydroperoxydehydroabietic acid. In the event that the oxidation is carried out on the molten ester, the temperature at which the oxidation is carried out must also be above the melting point of the ester, that is, for example, above about 68° C. in the case of methyl 9-oxodehydroabietate, etc.

The 14-hydroxy compound is then prepared from the 14-hydroperoxide by contacting the latter compound with a reducing agent. Either a metallic or nonmetallic reducing agent may be used. However, the nonmetallic reducing agents are preferred since the product obtained with these reducing agents is almost entirely the 14-hydroxy compound, whereas when metallic reducing agents are used, there is formed 7-acetyl-octahydro-1,4a-dimethyl-9-oxo-1-phenanthrenecarboxylic acid ester along with the 14-hydroxy-9-oxodehydroabietate. Hence, larger yields are obtained with the nonmetallic reducing agents. By the term "nonmetallic reducing agent" is meant compounds of nonmetals which exist in more than one valence state and in which the nonmetal is present in one of its lower valence states and is capable of being oxidized to one of its higher valence states. Exemplary of such nonmetallic reducing agents are the sulfide, mono-, di-, and poly-sulfide and mixtures thereof, sulfite, bisulfite, iodide, etc., anions. The nonmetallic reducing agent is preferably a water-soluble salt such as the alkali metal, alkaline earth metal, and ammonium salts of these nonmetallic reducing anions. By the term "metallic reducing agent" is meant any metallic compound containing a metallic atom which is capable of acting as a reducing agent, that is, which exists in more than one valence state and is in one of its lower valence states and is capable of being oxidized to one of its higher valence states. Exemplary of the metallic reducing agents which may be used are the salts such as the sulfates, nitrates, chlorides, naphthenates, acetates, etc., of iron, cobalt, nickel, manganese, chromium, tin, lead, mercury, copper, etc., wherein the metallic ion is in one of its lower oxidation states.

The reduction of the 14-hydroperoxide compound or the oxidate containing this hydroperoxide is preferably carried out in solution. Any inert solvent may be used for carrying out the reduction reaction but is preferably a polar solvent, that is, one in which ionization is possible. Any solvent in which both the hydroperoxide and reducing are soluble may be used, as, for example, aqueous methanol, ethanol, propanol, isopropanol, acetone, dioxane, etc. The reaction may also be carried out in a two-phase system, the hydroperoxide being dissolved in a solvent for it, such as diethyl ether, and this solution then intimately contacted with an aqueous solution of the reducing agent. The amount of solvent used may be varied over a wide range but should be sufficient to insure that the reaction mixture is homogeneous. Usually the hydroperoxide is dissolved in an amount of solvent to obtain a solution of about 1% to about 10% concentration.

The amount of reducing agent used in the process of this invention to obtain the alcohol from the hydroperoxide may be varied over a wide range, but preferably is an amount sufficient to provide one electron for each hydroperoxy radical to be reduced to the alcohol. Greater amounts of the reducing agent may be added if desired but are, of course, not necessary. The temperature at which the reduction reaction is carried out will depend upon the reducing agent being used, the solvent, etc. In general, a temperature of from about 0° C. to about 100° C., and preferably from about 20° C. to about 100° C., is used.

The esters of 14-hydroxy-9-oxodehydroabietic acid may be isolated from the reaction mixture in which they are produced in a variety of ways. One method of obtaining these esters in a very pure form is to isolate them by chromatography on an alumina column. Other adsorbents can, of course, be used in place of the alumina.

While the foregoing examples have shown the preparation of methyl 14-hydroxy-9-oxodehydroabietate, any other alkyl, hydroxyalkyl, cycloalkyl, aryl or aralkyl 14-hydroxy-9-oxodehydroabietate may be prepared in like manner. For example, ethyl, propyl, butyl, hydroxyethyl, glycerol, cyclohexyl, benzyl, etc., dehydroabietates may be oxidized with an oxygen-containing gas in the presence of a metallic compound or the 9-oxo derivatives of these esters may be oxidized in the presence of a peroxide catalyst to produce the 14-hydroperoxide which may then be reduced to yield the desired ester.

The free acid, 14-hydroxy-9-oxodehydroabietic acid, is readily obtained from the alkyl 14-hydroxy-9-oxodehydroabietates by saponification. Any of the usual methods of carrying out the saponification normally employed in the preparation of an acid from an ester may be used.

Either the free acid or the esters thereof may be acylated to form the corresponding 14-acyloxy-9-oxodehydroabietate. The foregoing examples have illustrated the preparation of the acetoxy derivative by treatment with acetic anhydride. Any mild acrylating agent may be used, as, for example, acetic anhydride, propionic anhydride, or other alkanoic acid anhydride, etc.

That the hydroxyl group of the new ketohydroxydehydroabietic acid compounds of this invention is in the 14-position and has the structural formula set forth above has been shown by the fact that a crystalline monoacetate may be produced which, when heated above its melting point will liberate acetic acid, and which has an analysis in agreement with that of the monoacetate. Other proof is found in the fact that on dehydration of the esters of 14-hydroxy-9-oxodehydroabietic acid, an isopropenyl compound is produced, i. e., the ester of octahydro-7-isopropenyl-1,4a-dimethyl - 9 - oxo - 1 - phenanthrenecarboxylic acid. The latter compound when ozonized yielded formaldehyde and the ester of 7-acetyloctahydro-1,4a-dimethyl-9-oxo - 1 - phenanthreneacetic acid. Thus, it is believed that there is no question but that the hydroxyl group is in the 14-position, the oxo group being in the 9-position since the compound may be prepared from the 9-oxodehydroabietic acid ester.

The new products of this invention having a hydroxyl group in the 14-position and an oxo group in the 9-position of the dehydroabietic acid nucleus are valuable intermediates in the synthesis of new derivatives of the resin acids and particularly in the synthesis of the 7-isopropenyl and 7-acetyl compound mentioned above. The latter two compounds are both useful materials. For example, the esters of octahydro-7-isopropenyl-1,4a-dimethyl-9-oxo-1-phenanthrenecarboxylic acid are valuable copolymerizable monomers which may be used as a replacement for part of the styrene used in a standard GR-S process and obtain a rubber having the properties of "cold rubber" without resorting to the necessity of using "cold rubber" techniques. The esters of 7-acetyl-octahydro-1,4a-dimethyl-9-oxo-1-phenanthrenecarboxylic acid are useful as latent crystalline plasticizers in neoprene delayed tack adhesives. Hence, the new products of this invention make it possible to produce new and useful polymerizable monomers and plasticizers. They are also of value as intermediates in the synthesis of pharmaceutical materials.

This application is a continuation-in-part of my application Serial No. 251,252, filed October 13, 1951, now abandoned.

What I claim and desire to protect by Letters Patent is:

1. A dehydroabietic acid derivative selected from the group consisting of 14-hydroxy-9-oxodehydroabietic acid and 14-acyloxy-9-oxodehydroabietic acid and the lower alkyl esters thereof.
2. 14-hydroxy-9-oxodehydroabietic acid.
3. A lower alkyl ester of 14-hydroxy-9-oxodehydroabietic acid.
4. A lower alkyl ester of 14-acyloxy-9-oxodehydroabietic acid.
5. Methyl 14-hydroxy-9-oxodehydroabietate.
6. Methyl 14-acetoxy-9-oxodehydroabietate.
7. The process of preparing a lower alkyl ester of 14-hydroxy-9-oxodehydroabietic acid which comprises contacting a lower alkyl ester of 14-hydroperoxy-9-oxodehydroabietic acid with a nonmetallic reducing agent selected from the group consisting of water-soluble alkali metal, alkaline earth metal, and ammonium sulfides, sulfites, bisulfites, and iodides.
8. The process of preparing methyl 14-hydroxy-9-oxodehydroabietate which comprises contacting methyl 14-hydroperoxy-9-oxodehydroabietate with a nonmetallic reducing agent selected from the group consisting of water-soluble alkali metal, alkaline earth metal, and ammonium sulfides, sulfites, bisulfites, and iodides.
9. The process of preparing methyl 14-hydroxy-9-oxodehydroabietate which comprises contacting methyl 14-hydroperoxy-9-oxodehydroabietate with an alkali metal sulfide.

References Cited in the file of this patent

UNITED STATES PATENTS

| | | |
|---|---|---|
| 2,434,643 | Drake | Jan. 20, 1948 |
| 2,484,841 | Lorand | Oct. 18, 1949 |
| 2,656,343 | Ritchie | Oct. 20, 1953 |
| 2,656,344 | Ritchie | Oct. 20, 1953 |